P. & W. G. SNYDAM.
Miter-Box.
No. 159,368.  Patented Feb. 2, 1875.
Fig. 1.
Fig. 2.
Fig. 3.
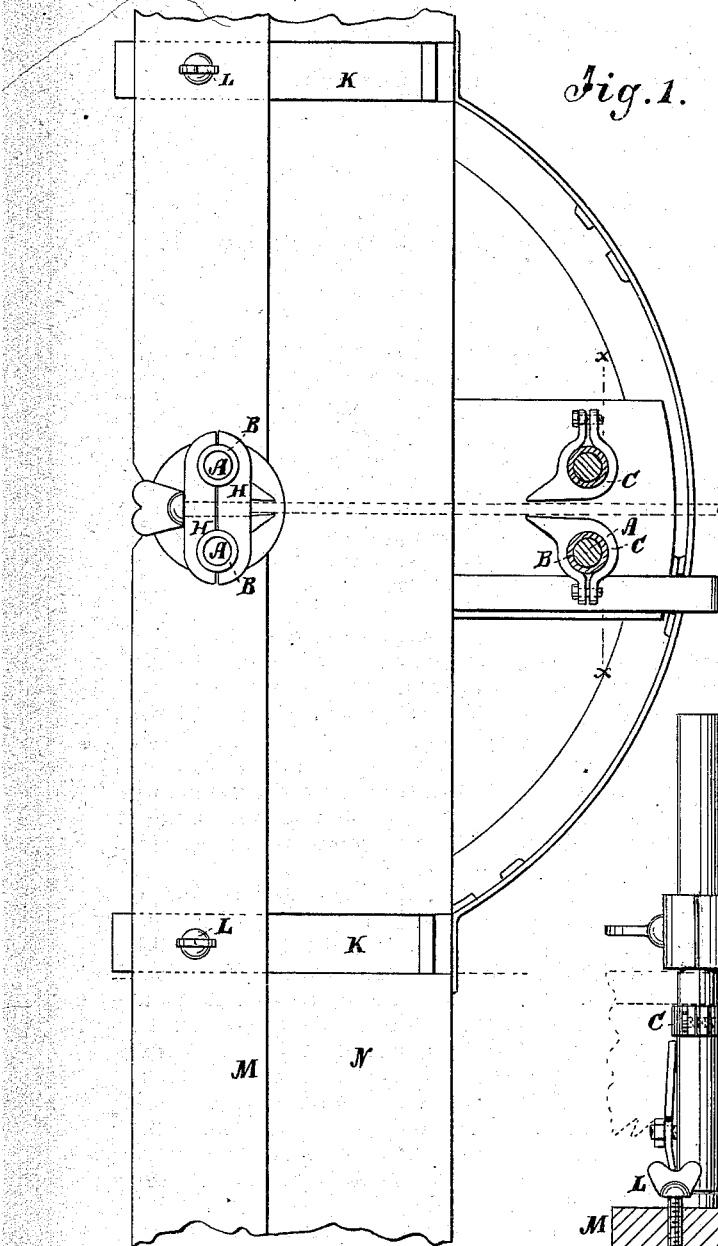
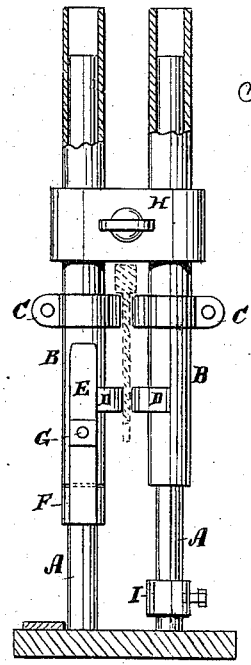
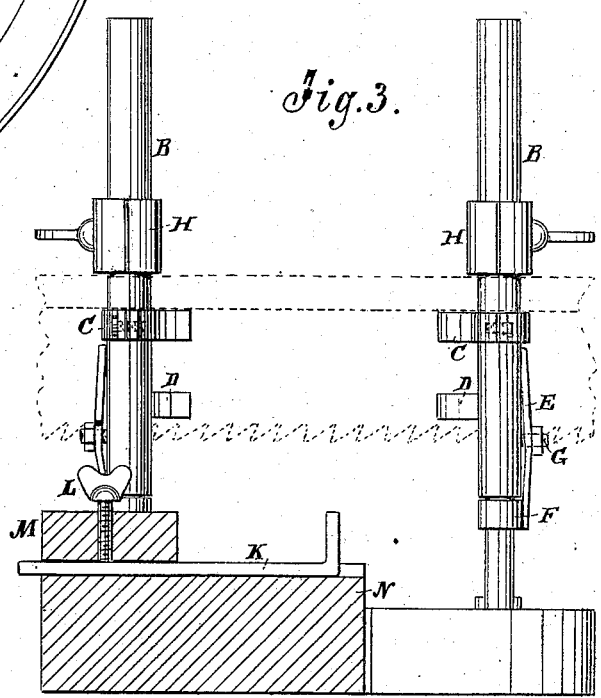
WITNESSES:
A. Bennerkendorf
C. Kilquick
INVENTOR:
P. Suydam
W. G. Suydam
BY
ATTORNEYS.

UNITED STATES PATENT OFFICE.

PETER SUYDAM AND WILLIAM G. SUYDAM, OF NEW BRUNSWICK, N. J.

IMPROVEMENT IN MITER-BOXES.

Specification forming part of Letters Patent No. 159,368, dated February 2, 1875; application filed June 27, 1874.

*To all whom it may concern:*

Be it known that we, PETER SUYDAM and WILLIAM G. SUYDAM, of New Brunswick, in the county of Middlesex and State of New Jersey, have invented a new and Improved Miter-Box, of which the following is a specification:

Our invention relates essentially to the guide-posts of a miter-box for guiding and controlling the saw, but it also includes adjustable holders, to be used when sawing spring-miters.

For the saw guiding and regulating posts we have two rigid posts or rods side by side, with tubes to rise and fall on them, said tubes carrying guides for the sides of the saw, which are adjustable for saws of any thickness, and for taking up the slack caused by wear, and one of said tubes carries a spring-presser to hold them up above the working position when required for adjusting the saw on the work, and one of the posts has an adjustable stop-collar to regulate the descent of the saw. The adjustable holders for spring-miters consist of horizontal bars with a vertical piece at one end arranged to slide forward and backward across the bottom of the box, and toward and from the back of the box, to hold one edge of the work while the other rests on the top of the back, said bars being provided with set-screws for holding them.

Figure 1 is partly a plan view and partly a horizontal section of our improved miter-box. Fig. 2 is a section on the line $x\ x$ of Fig. 1. Fig. 3 is a transverse section on the line $y\ y$ of Fig. 1.

Similar letters of reference indicate corresponding parts.

A represents two posts of small round iron or other substance placed side by side about as far apart as the thickness of the saw-back, in the positions of the ordinary single or divided posts of a miter-box. B represents metal tubes about as long as the posts, fitting nicely on each, and carrying an adjustable saw-guide, C, and a fixed one, D. One of said tubes also carries a pressure-spring, E, collar F, and adjusting-screw G, by which friction is to be produced to hold the tubes at any required height on the posts, and with any required amount of force. H is a clamp applied to the two tubes of each pair of posts above the upper saw-guides to clamp the tubes when the guides have been adjusted to the saw and hold them.

The clamp is adjustable up and down the tubes, to adapt them to saws of different widths, and the upper guides are also adjustable for the same purpose, and to arrange them directly under the back of the saw for it to run upon.

The tubes are raised with the saw as it is lifted above the work, and they shift down with it to an adjustable stop, I, on one of the rods, to be set at any point at which it is desired to stop the saw.

By the use of these adjustable saw-guides the box may be readily adapted to saws of any width and thickness, and the wear of the guides by the teeth of the saw, common to most machines, is prevented.

K represents the adjustable holders, and L the binding-screws therefor, arranged in connection with the back M and bed N, for holding "spring-meters"—that is, moldings constructed in skeleton form of strips of thin material, and having no wide base to rest on the bed so as to be held upright thereby, but which require to be supported on the bed at the front edge, and on the back of the box at the back edge, and at the same time have the front held just the right distance from where the rear part rests on the back of the box to keep the work upright.

Having thus described our invention, we claim as new and desire to secure by Letters Patent—

1. A pair of stationary posts, A, with guide-tubes B, having saw-guides D C, and a clamp, H, combined to form the guide-post of a miter-sawing machine, substantially as specified.

2. The combination of an adjustable presser-spring, E, and collar F, with a tube, B, and post A, substantially as specified.

PETER SUYDAM.
WM. G. SUYDAM.

Witnesses:
C. W. SCHUYLER,
FREDERICK STAAT, Jr.